United States Patent
Serebrin (10) Patent No.: US 10,185,690 B1
(45) Date of Patent: *Jan. 22, 2019

(54) COMPUTER INTERCONNECT ISOLATION

(71) Applicant: Google LLC, Mountain View, CA (US)

(72) Inventor: Benjamin C. Serebrin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,016

(22) Filed: Oct. 23, 2017

Related U.S. Application Data (63) Continuation of application No. 14/945,946, filed on Nov. 19, 2015, now Pat. No. 9,824,049, which is a continuation of application No. 13/826,884, filed on Mar. 14, 2013, now Pat. No. 9,223,737.

(51) Int. Cl.
*G06F 13/40* (2006.01)
*G06F 13/42* (2006.01)

(52) U.S. Cl.
CPC ........ *G06F 13/404* (2013.01); *G06F 13/4022* (2013.01); *G06F 13/4027* (2013.01); *G06F 13/4282* (2013.01)

(58) Field of Classification Search
CPC .. G06F 12/0292; G06F 12/10; G06F 12/1036; G06F 12/1081; G06F 12/109; G06F 12/1458; G06F 12/1475; G06F 12/1483; G06F 13/14; G06F 13/20; G06F 13/38; G06F 13/385; G06F 13/387; G06F 13/4004; G06F 13/4022; G06F 13/4027; G06F 13/404; G06F 13/4267; G06F 13/4282; G06F 21/44; G06F 21/70; G06F 21/73

See application file for complete search history.

(56) References Cited

U.S. PATENT DOCUMENTS

| | | |
|---|---|---|
| 8,265,075 B2 | 9/2012 | Pandey |
| 8,301,806 B2 | 10/2012 | Brownlow et al. |
| 9,824,049 B1 * | 11/2017 | Serebrin ............. G06F 13/4027 |
| 2005/0237327 A1 | 10/2005 | Rubinstein et al. |
| 2006/0242352 A1 | 10/2006 | Torudbakken et al. |
| 2008/0137676 A1 | 6/2008 | Boyd |
| 2009/0113430 A1 | 4/2009 | Riley |
| 2010/0014526 A1 | 1/2010 | Chavan et al. |
| 2011/0010481 A1 * | 1/2011 | Hamadani ........... G06F 13/4022 710/313 |
| 2011/0202701 A1 | 8/2011 | Maitra |
| 2012/0096192 A1 | 4/2012 | Tanaka et al. |
| 2012/0166690 A1 | 6/2012 | Regula |

(Continued)

OTHER PUBLICATIONS

Budruk, Ravi, PCI Express Basics, PCI-SIG Developers Conferences, 2007, 40 pages.

(Continued)

*Primary Examiner* — Thomas J Cleary
(74) *Attorney, Agent, or Firm* — Fish & Richardson P.C.

(57) ABSTRACT

Methods and systems are provided routing access requests produced by a function to a physical sharing machine on a computer interconnect fabric. Access requests are routed through a switch that includes an NTB, the NTB using an address-lookup table to ensure that access requests made by multiple physical sharing machines are appropriately isolated from one another.

12 Claims, 6 Drawing Sheets

(56) References Cited

U.S. PATENT DOCUMENTS

2012/0209940 A1 8/2012 Kidambi et al.
2012/0284712 A1 11/2012 Nimmagadda et al.
2012/0324442 A1 12/2012 Barde
2014/0281040 A1 9/2014 Liu

OTHER PUBLICATIONS

Gudmundson, John, PLX Technology, "Enabling Multi-Host System Designs with PCI Express Technology," Tech Feature, PCI Express, RTC, May 2004, 5 pages.
PCI-SIG SR-IOV Primer, An Introduction to SR-IOV Technology, Intel LAN Access Division, Jan. 2011, 28 pages.
Pettey, Chris, PCI-SIG Multi-Root Overview, 31 pages, downloaded from the internet on Mar. 7, 2013, http://www.pcisig.com/developers/main/training_materials/get_document?doc_id=656dc1d4f27b8fdca34f583bdc9437627bc3249f.
Regula, Jack, "Using Non-Transparent Bridging in PCT Express Systems," Jun. 1, 2004, 31 pages.

\* cited by examiner

COMPUTER INTERCONNECT ISOLATION

CROSS-REFERENCE TO RELATED APPLICATION

This Application is a continuation of U.S. application Ser. No. 14/945,946, titled "COMPUTER INTERCONNECT ISOLATION" filed Nov. 19, 2015, which is a continuation of U.S. application Ser. No. 13/826,884, now U.S. Pat. No. 9,223,737, titled "COMPUTER INTERCONNECT ISOLATION" filed Mar. 14, 2013. The disclosure of each application is incorporated herein by reference in their entirety.

BACKGROUND

This specification describes communication technologies in computer architecture. More specifically, this specification describes technologies related to routing requests produced by accessing a function at a device to a physical sharing machine on a computer interconnect fabric.

Some computer interconnect architectures, such as PCIe (PCI Express) define ways for devices connected to the architecture to be self-virtualizing. Virtualization provides the ability to run multiple environments, known as virtual machines, on a single system. Frequently, virtualization isolates the virtual machines from one another, so that even though the virtual machines may be running on the same hardware, they are able to operate independently so that each has independent access to its own set of resources and they do not interfere with each other.

PCIe is a popular computer interconnect architecture for interconnecting components of a computing system that is fast, scalable, and flexible. PCIe includes a computer interconnect fabric which is frequently based on a combination of switches that provide point-to-point communication within the network. Traffic in a PCIe network is directed by a root complex devices that manages information exchange between a processor and memory and devices on the network.

In order to combine techniques in PCIe with virtualization, Single-Root Input/Output Virtualization (SR-IOV) provides a way for a single root function, such as a network port, to be shared between multiple virtual machines.

However, while SR-IOV permits sharing of a physical resource by multiple virtual machines within a single host, SR-IOV does not define a capability to share resources across multiple hosts.

SUMMARY

The systems and methods described in this application route virtual function requests to a physical sharing machine on a computer interconnect fabric. In particular, the systems and methods facilitate filtering device-originated virtual function accesses to protect both other devices and sharing machines in situations in which the device or machine cannot, on its own, filter by a PCI source identifier. Example implementations that accomplish this routing task by means of non-transparent bridges (NTBs) and address-lookup tables (A-LUTs) in conjunction with access control services (ACS) to ensure that functions are only accessible to the extent that they should be accessible, and other access requests are blocked.

In general, one innovative aspect of the subject matter described in this specification can be implemented in various methods. For example, an implementation may be a method that includes receiving an access request at a computer interconnect fabric, caused by accessing a function provided by a device coupled to the computer interconnect fabric, the access request being directed to a physical sharing machine that is communicatively coupled to the computer interconnect fabric through a non-transparent bridge (NTB), wherein the physical sharing machine is associated with a global address range and an ID; routing the access request through the computer interconnect fabric from the device to a pre-defined port of a switch at which an NTB is enabled; using address and source identity information related to the access request received at the switch to retrieve a corresponding entry in an address-translation lookup table at the switch, wherein the entry includes the identity of the function, and the global address range and the ID of the physical sharing machine; confirming, based on the entry, that the function is allowed to access the physical sharing machine, and in response to the confirming: translating the access request based on the entry, to be routed using the switch to an offset within the global address range of the physical sharing machine with which the request is associated; and routing the access request to the physical sharing machine based on the global address range, the offset, and the ID.

Other implementations of these aspects include corresponding systems, apparatus, and computer programs, configured to perform the actions of the methods, encoded on computer storage devices.

These and other implementations may each optionally include one or more of the following features. For example the computer interconnect fabric may be a PCIe fabric and the ID may be a PCIe source ID. The device may be a self-virtualizing device under the SR-IOV specification. The function may be a virtual function. In one implementation, the switch may be located on a chip that is distinct from the computer interconnect fabric. In another implementation, the switch may be located on a chip that is integrated into the computer interconnect fabric. The access request may be a bus-master access request. In an implementation, all access requests from the device are required to pass through the pre-defined port by access control services built into the computer interconnect fabric. In an implementation, translating the access request may include sending the access request through a loopback connection back into the switch; and translating the access request into the global address range, by the switch, after receiving the access request from the loopback connection. In another implementation, translating the access request includes translating the access request into the global address range, by the switch, prior to routing the access request to the physical sharing machine.

The implementations described below are examples of specific ways of implementing the technology described by this application. However, the technology that is the subject of this application may include other related implementations as well. For example, while implementations are described in connection with the PCIe interconnect architecture, implementations may operate in connection with other interconnect architectures in a manner that facilitates filtering device-originated virtual function accesses to protect both other devices and sharing machines in situations in which the device or machine cannot, on its own, filter by an interconnect source identifier.

Particular implementations of the subject matter described in this specification can be implemented so as to realize one or more of the following advantages. In one implementation, the systems and methods described in this specification provide a general solution to allowing multi-function or SR-IOV devices to be shared securely on a PCIe fabric without the need for investing the time, effort, and expense of preparing custom silicon. Implementations may provide a flexible PCIe fabric sharing architecture, and add NTBs as needed to support various device configurations.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

A problem confronted in computer architecture is the sharing of resources across a computer interconnect architecture while ensuring proper isolation. The solution provided by the implementations described below includes using non-transparent bridges (NTBs) in combination with address-translation lookup tables (A-LUTs). The implementations described below are examples of specific ways of implementing the technology described by this application. However, the technology that is the subject of this application may include other related implementations as well. For example, while implementations are described in connection with the PCIe interconnect architecture, NTBs and A-LUTs, implementations may operate in connection with other architectures that route requests to physical sharing machines while maintaining isolation as described below.

PCIe, a standard computer interconnect architecture, defines self-virtualizing devices under the SR-IOV specification. SR-IOV assumes the presence of a hypervisor and input/output (I/O) memory management units (IOMMUs). In the example PCIe implementations, the systems and methods thus provide functionality that filters device-originated virtual functions accesses in order to protect both other devices and sharing machines from illegal access attempts where the device or machine is unable to filter by PCI source ID on its own.

Example implementations include SR-IOV devices and Non-Transparent Bridges (NTBs) to allow multiple host machines to connect to a common PCIe interconnect. An NTB may lack sufficient granularity to allow the devices on one side of the NTB to distinguish between the virtual functions (VFs) of devices on the other side. Accordingly, the systems and methods of this specification ensure that all NTBs can be used to maintain required isolation for functions in a computer interconnect architecture, and also provide a general mechanism for allowing all SR-IOV devices to work with proper isolation in the context of various systems. For example, the systems and methods described below allow for constrained address ranges to be applied to devices that cannot otherwise be modified to provide address range isolation.

Several example implementations are described with respect to FIGS. 1-4 below. At a high level, these implementations route access requests produced by a function, provided by a device, to a physical sharing machine on a computer interconnect fabric in a manner that maintains the protective isolation described above. More particularly, the implementations receive access requests and force them through a switching mechanism that does a lookup in an address-lookup table to ensure that the access requests are valid and gather necessary routing information before sending them to multiple physical sharing machines in a way that preserves isolation. Examples of several implementations are described in more detail below.

In each implementation, an access request is received from a device at the computer interconnect fabric. The access request may originate in response to accessing a virtual function provided by a device connected to the fabric. The device is connected to the fabric through an NTB, which facilitates the routing of the access request. The access request is directed to a physical sharing machine that is associated with a global memory address range and an ID. The global memory address range ensures the isolation of the physical sharing machine, as access requests must be sent to the appropriate global memory address range that is mapped to the physical sharing machine. The access request also includes the ID of the physical sharing machine, which is used to identify the source of the access request.

In some implementations, the access request is routed through a specific port of a switch into an NTB. By requiring the routing, it becomes possible to route the access request through a switch in a manner that guarantees that only access requests that do not violate isolation requirements are allowed to reach their destination. In order to enforce this guarantee, at the switch information associated with the access request is used to retrieve an entry in an address-translation lookup table. Assuming that the access request is a valid request, the entry provides information about the identity of the function and information about the global memory address range and ID of the physical sharing machine. If the access request is found to be invalid based on the address-translation lookup table, it is aborted. However, if the address-translation lookup is successful, the switch confirms this fact, and uses the information from the address-translation lookup to translate the access request so it is translated to the appropriate memory address for the physical sharing machine. Subsequently, the translated access request is routed to the physical sharing machine.

Several example implementations will now be described with reference to FIGS. 1-4 below. The example implementations are illustrative and not limiting, and other appropriate architectures that facilitate the functionality of filtering device-originated virtual functions accesses in order to protect both other devices and sharing machines from illegal access attempts where the device or machine is unable to filter by PCI source ID on its own can be used.

Figure 1:
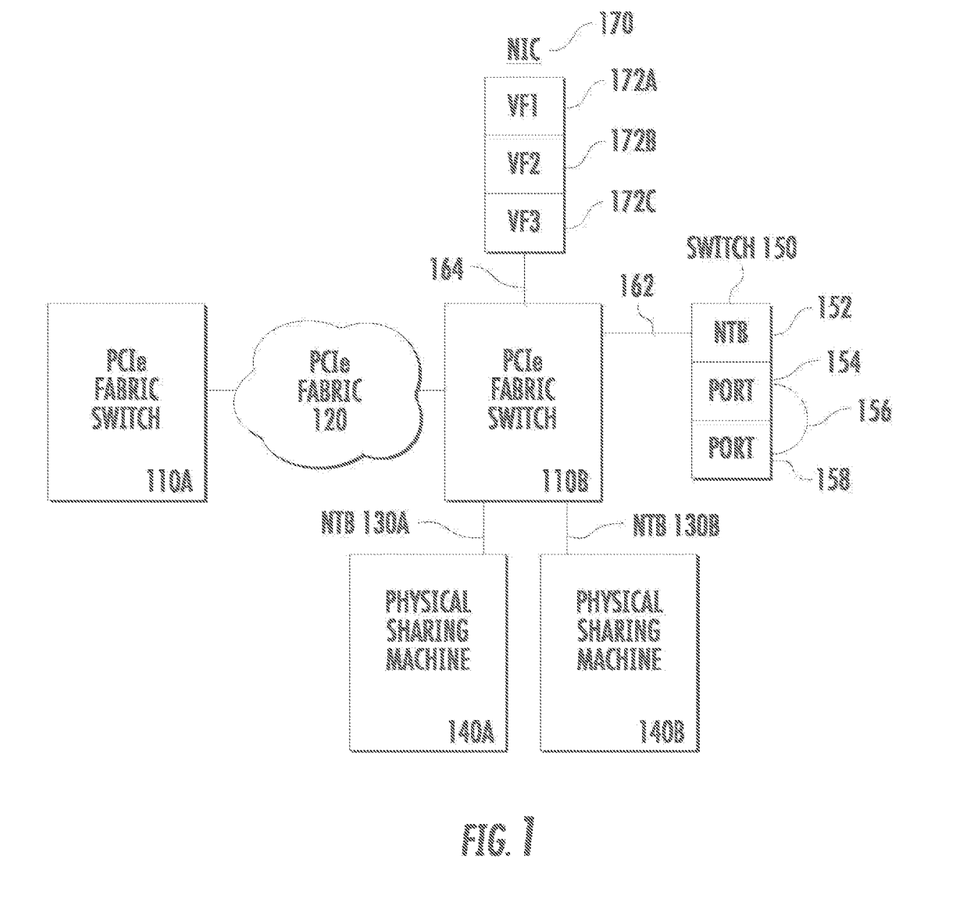
FIG. 1 is a block diagram of a first implementation using a switch that includes an NTB with loopback to direct requests by a function from a device on an interconnect fabric.

FIG. 1 is a block diagram of a first implementation using a switch that includes an NTB with loopback to direct requests by a function from a device on an interconnect fabric. The backbone of the interconnect fabric is provided by one or more PCIe fabric switches 110A and 110B. PCIe fabric switches 110A and 110B handle the main routing tasks in this implementation. The switches 110A and 110B are interconnected through PCIe fabric connection 120.

PCIe fabric switch 110B is connected to two physical sharing machines 140A and 140B. Each physical sharing machine 140A and 140B is connected to PCIe fabric switch 110B by an NTB 130A and 130B, respectively. NTBs 130A and 130B are placed between PCIe fabric switch 110B and physical sharing machines 140A and 140B to facilitate the isolation for virtual functions. By placing the NTBs between the switches and the physical sharing machines, only access requests that are routed appropriately with the requisite addressing are accessible to physical sharing machines 140A and 140B.

The functionality provided by implementations includes routing access requests from a device attached to the PCIe interconnect fabric. As illustrated in FIG. 1, the device that sends requests may be a network interface card (NIC) 170. However, a NIC is merely an example and many other devices may communicate through the interconnect fabric. NIC 170 provides access to a network for devices that interact with it. However, there is only one physical NIC 170 in FIG. 1. By providing virtual functions (VFs) 172A-172C, it becomes possible to share the NIC 170 hardware between multiple physical sharing machines 140A and 140B. Moreover, by virtualizing in the manner disclosed by these implementations, it is possible to share NIC 170 while ensuring that separate requests are isolated from one another.

The dataflow of FIG. 1 originates when NIC 170 (or another PCIe device) originates a bus-master access request. A bus-master access request is a request to read or write data that originates at the device, directed to another device on the PCIe fabric. In the context of NIC 170, such a bus-master access request might include a request to read or write information received from or requested by the network connected to NIC 170. For example, physical sharing machine 140B may be configured to interact with NIC 170 through virtual function VF2 172B. Traffic for the virtual function VF2 172B will route between physical sharing machine 140B and the network to which NIC 170 is connected. Assume that NIC 170 receives a request to send a packet from physical sharing machine 140B to another computer on the network, or alternatively that NIC 170 receives a request to read a packet from the network to be written to physical sharing machine 140B. In both of these cases, a bus-master access request will occur because NIC 170 needs to communicate with physical sharing machine 140B to facilitate information interchange with the network.

In operation, the bus-master accesses request is passed through an A-LUT to facilitate the desired isolation. To isolate devices, implementations force the device to pass all bus-master (device-originated reads or writes) accesses through the A-LUTs. Because the accesses are forced through the BAR corresponding to the A-LUT's address range, any accesses that would violate isolation requirements can be recognized during the mapping process at the A-LUTs and appropriately aborted.

One way to force the requests through the A-LUTs is to use PCIe's access control services (ACS) on the PCIe switch to require at the port on which the device is connected to the fabric to send bus-master packets from bus-master requests only to the port containing the properly configured A-LUTs. Because PCIe is address routed, any addresses that do not target the allowed port will be blocked and the device will be given an abort signal. Thus, the only requests that are successfully transmitted will be those that go through the A-LUTs. To complement this requirement, existing software at the physical sharing machines may be used to configure the sharing machines to program the devices to use only the appropriate address ranges for passing requests through the A-LUTs.

In an example use case, VF2 172B may originate a bus-master access request to communicate with physical sharing machine 140B. The way in which the bus-master access request is handled will be discussed in greater detail in connection with FIG. 5, below. The request from VF2 172B is routed into the PCIe fabric switch 110B to which NIC 170 is coupled by connection 164. As discussed above, the request is forced through a pre-determined port 162 of PCIe fabric switch 110B so as to be transmitted into switch 150. The request may be forced through port 162 by functionality of PCIe such as access control services. By requiring that requests are forced through port 162, all requests must meet the isolation requirements imposed as part of the switching process.

Once the bus-master access request enters switch 150, it passes through NTB 152. NTB 152 contains an A-LUT table, which allows appropriate routing of the access request. In some implementations, the A-LUT is a page table where each entry uses an index to provide a translated base value that ensures that the mapped request will be sent to an appropriate destination. For example, there may be a request sent by VF2 172B with a certain address that matches the device's BAR register, and matches an A-LUT entry index and offset. The offset is the place within the address space of the sharing host to which the request needs to be routed. In the context of this process, the base address will generally refer to a PCI BAR. The base and index are used at the A-LUT to find a translated base that ensures that the request is restricted to the right address space. For example, a request may have a base of 1 GB and an index of 256 MB. When NTB 152 receives such a request, it enters the A-LUT, whose base is 1 GB. By referencing the A-LUT with the index, NTB 152 is able to retrieve a translated base address that corresponds with the index. For example, the translated base address that corresponds with the index may be 11 GB for a request that is to be sent to physical sharing machine 140B whose address space is between 11 GB and 12 GB. Similarly, if the request were to be sent to physical sharing machine 140A with an address space that is between 20 GB and 21 GB, the A-LUT would provide 20 GB as the base. The offset is not changed by the lookup and translation process provided by the A-LUT.

In addition to the translated base, the A-LUT may store information about how to route the request in the context of a PCIe fabric. Specifically, the A-LUT may store information about which virtual function is associated with bus-device-function (BDF) information. If VF2 172B is assigned to be PCIe bus:device 42:9, the A-LUT entry would store the BDF entry of 42:9.2 (bus 42, device 9, virtual function 2).

By using the information provided in the A-LUT, it becomes possible to ensure that requests are routed properly. However, according to the PCIe specification, a request that enters a switch should not leave the switch by the same port by which it enters. Hence, FIG. 1 illustrates an approach by which a loopback cable is used to address this issue. In FIG. 1, after the initial translation has been performed, the request is routed out of switch 150 through port 154, through a loopback cable 156, and back into switch 150 through port 158. After the request reenters switch 150, leaving switch 150 through port 162 is no longer leaving through the point of entry. Thus, at this point switch 150 is able to use the addressing information previously provided by the A-LUT at NTB 152 as it is routed into PCIe fabric switch 110B through port 162. The addressing information, including the BDF entry, directs the request through PCIe fabric switch to the appropriate NTB 130B that connect physical sharing machine 140B to PCIe fabric switch. The A-LUTs ensure that when the request is passed through NTB 130B into physical sharing machine 140B, physical sharing machine 140B is able to communicate with the appropriate virtual function provided by the NIC 170, while allowing NIC 170 to simultaneously have isolated interaction with the other physical sharing machines.

A variety of switch devices that facilitate PCIe switching may be used. Such a device may be a switch chip that has a standard NTB extended with Address-translation Lookup Tables (A-LUTs). The operation of the A-LUTs is discussed in greater detail in FIG. 5. A-LUTs serve as a single-level page table. In some examples, the A-LUTs may include up to 256 entries, but implementations that use A-LUTs with more entries or manage mapping using page tables with multiple levels can also be used. The entries in the A-LUTs facilitate communications between devices and physical sharing machines that invoke functions by enforcing restrictions on address mappings. Entry size may be configurable to any power of 2 that is 4096 bytes or greater, though some implementations may use other sizes, and in some implementations all entries in a given direction of the NTB are the same size. Each A-LUT entry can be marked with the PCI IDs that are allowed to use the entry. A disallowed PCI ID attempting to access an entry will receive an appropriate abort signal. Because disallowed PCI IDs may be blocked, this preserves isolation requirements for the functions managed by the A-LUTs.

In the implementation of FIG. 1, a PCIe switch chip 150 has three ports and handles routing the requests through an NTB. The switch chip may be attached to a port on the main switch chip 110B. All device transactions are directed to this chip, as described above.

Figure 2:
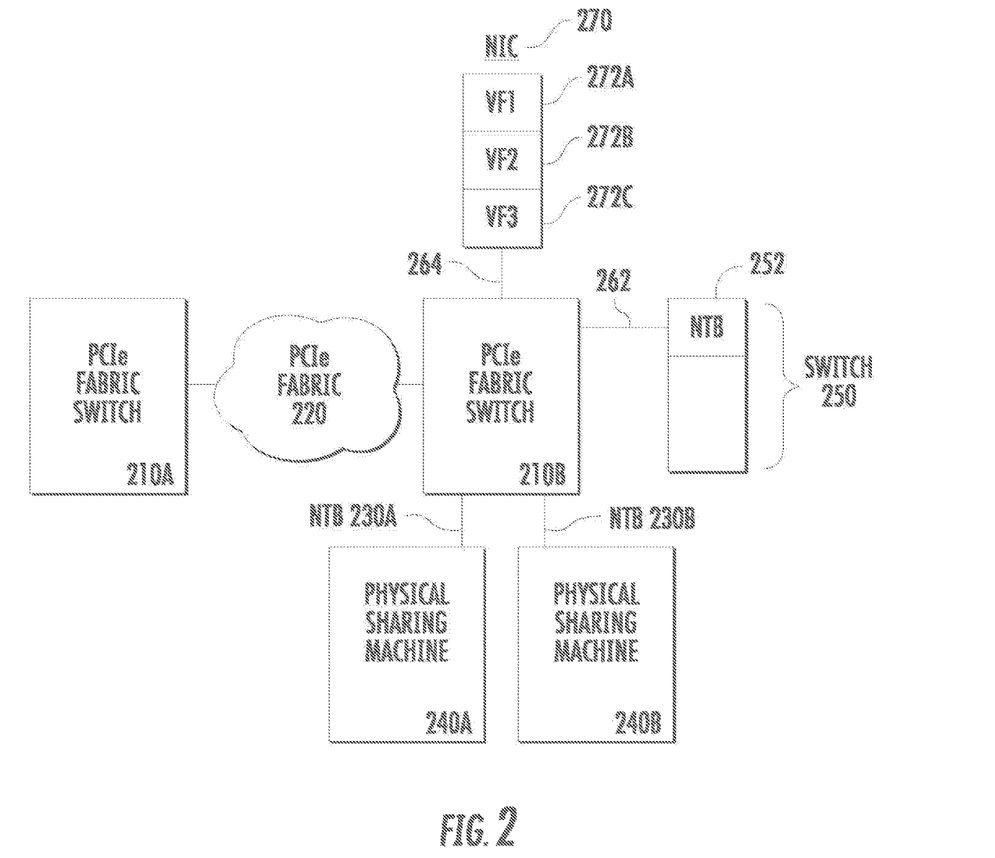
FIG. 2 is a block diagram of a second implementation using a switch that includes an NTB where input and outputs share the same port to direct requests by a function from a device on an interconnect fabric.

FIG. 2 is a block diagram of a second implementation using a switch that includes an NTB where input and outputs share the same port to direct requests by a function from a device on an interconnect fabric. Components of FIG. 2 may be considered to correspond directly to components of FIG. 1 with analogous numbering. However, the difference between FIG. 1 and FIG. 2 is the approach used in switch 250. Rather than using a loopback cable, switch 250 receives the request through port 262 and sends it directly back into PCIe fabric switch 220B through port 262. Thus, the implementation of FIG. 2 requires a switch 250 that is capable of being configured to send the addressed request out the same port 262 through which it entered.

In the implementation of FIG. 2, the A-LUT entries directly target the client address range. The implementation of FIG. 2 does not strictly comply with PCIe specification by allowing a PCIe transportation layer packet (TLP) to exit the same port it entered, but if the switch allows such a transaction, there is no other detection mechanism that would prevent this action. For example, the switch chip in this second implementation may be configured in this matter. The PCIe specification allows Root Complexes to resend packets out the same port they entered.

Figure 3:
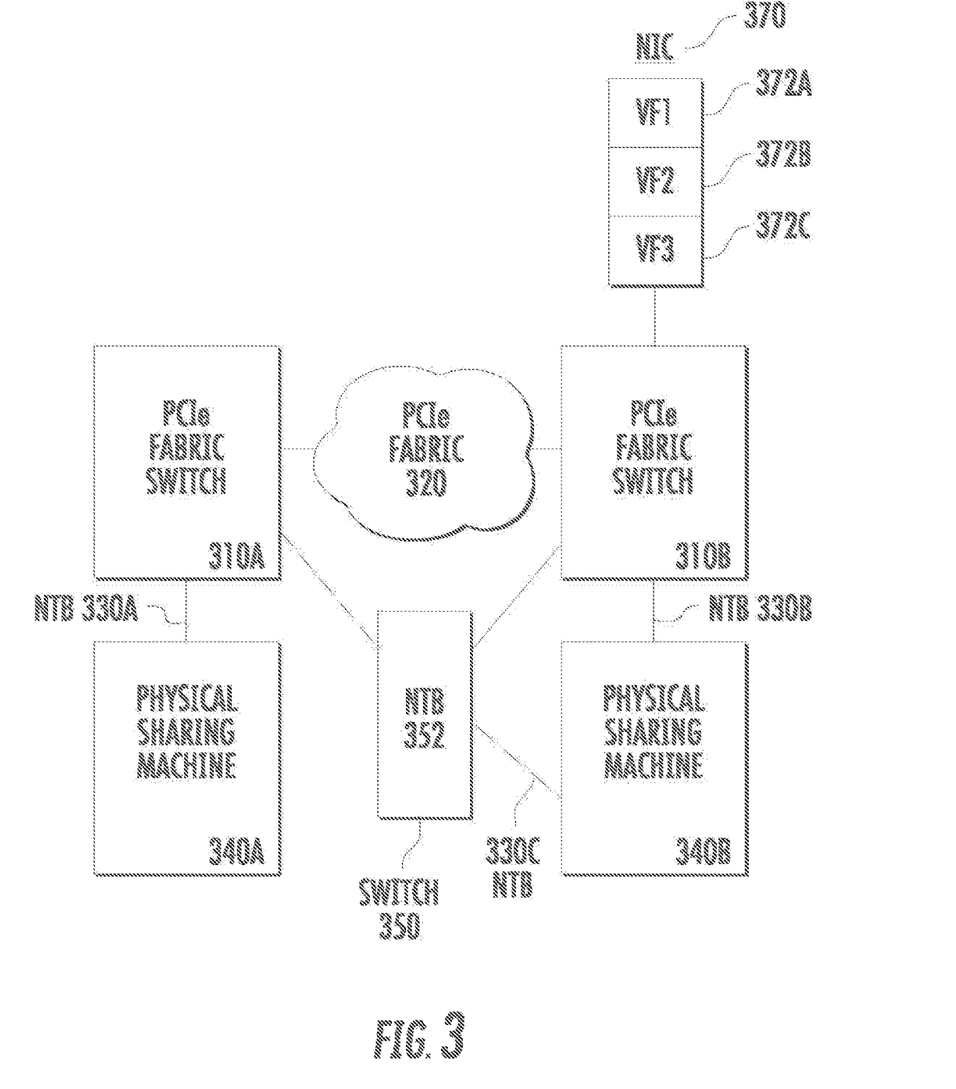
FIG. 3 is a block diagram of a third implementation using a switch that includes an NTB that is cross-coupled to two sides of a network architecture to direct requests by a function from a device on an interconnect fabric.

FIG. 3 is a block diagram of a third implementation using a switch that includes an NTB that is cross-coupled to two sides of a network architecture to direct requests by a function from a device on an interconnect fabric. FIG. 3 illustrates one physical sharing machine 340A being connected to PCIe fabric switch 310A on one side of PCIe fabric 320 and another physical sharing machine 340B is connected to PCIe fabric switch 310B on the other side of PCIe fabric 320.

The implementation of FIG. 3 may reduce hops relative to the number of hops in FIGS. 1 and 2. In FIG. 3, NIC 370 provides virtual functions VF1 372A, VF2 372B, and VF3 372, which are forced to enter PCIe fabric switch 320B through port 364 as discussed above. However, the routing process differs based on which side of the routing fabric the request has as its intended destination. The switch 350 is similar to switch 150 and switch 250 in that it has an integrated NTB 352 with built-in A-LUTs that help with the routing process for access requests. In the architecture illustrated in FIG. 3, however, the switch 350 is cross-coupled to PCIe fabric switch 310A and PCIe fabric switch 310B. How a request is routed in FIG. 3 depends on which side of the fabric it is intended for. If it is intended for sharing machine 340A, coupled to PCIe fabric switch 310A through NTB 330A, a request from one of the virtual functions at NIC 370 may be routed through port 364, then routed through PCIe fabric switch 310B through NTB 352 at switch 350 so that the request is appropriately routed through NTB 330A so that it is properly isolated before arriving at physical sharing machine 340A.

If, on the other hand, the request is intended to be sent to sharing machine 340B, the request is still forced through port 364 and then into switch 350 and NTB 352. However, switch 350 may be integrated into or coupled to PCIe fabric switch 310B in a manner such that switch 350 routes the appropriately addressed request through NTB 330C into physical sharing machine 340B to guarantee that the request passes through A-LUTs rather than simply relying on being passed through NTB 330B that couples PCIe fabric switch 310B to physical sharing machine 340B.

Thus, in FIG. 3, the functionality of the NTBs and the A-LUTs is similar to that of the other implementations, but, as described above, the sharing switch 350 can minimize architecture complexity and reduce hops.

In the implementation of FIG. 3, the design uses two large switch chips 310A and 310B, as the main PCIe fabric. If this scenario were confronted in the approach used in the first implementation, it would require a switching chip, such as a three port switch chip as described above, to route requests through an NTB and an A-LUT on each of the two large switch chips. In this implementation, however, the three port switch chip 350 cross-couples the larger main switch chips. The cross-coupling switch chip is attached to one large switch directly, such as via a slot in one example system, and is cabled to an ingress port on the other large switch. The three port switch 350 has NTBs (and thus A-LUTs) operating in each direction, and the main switch chips may be connected via a 16-lane PCIe connection.

Figure 4:
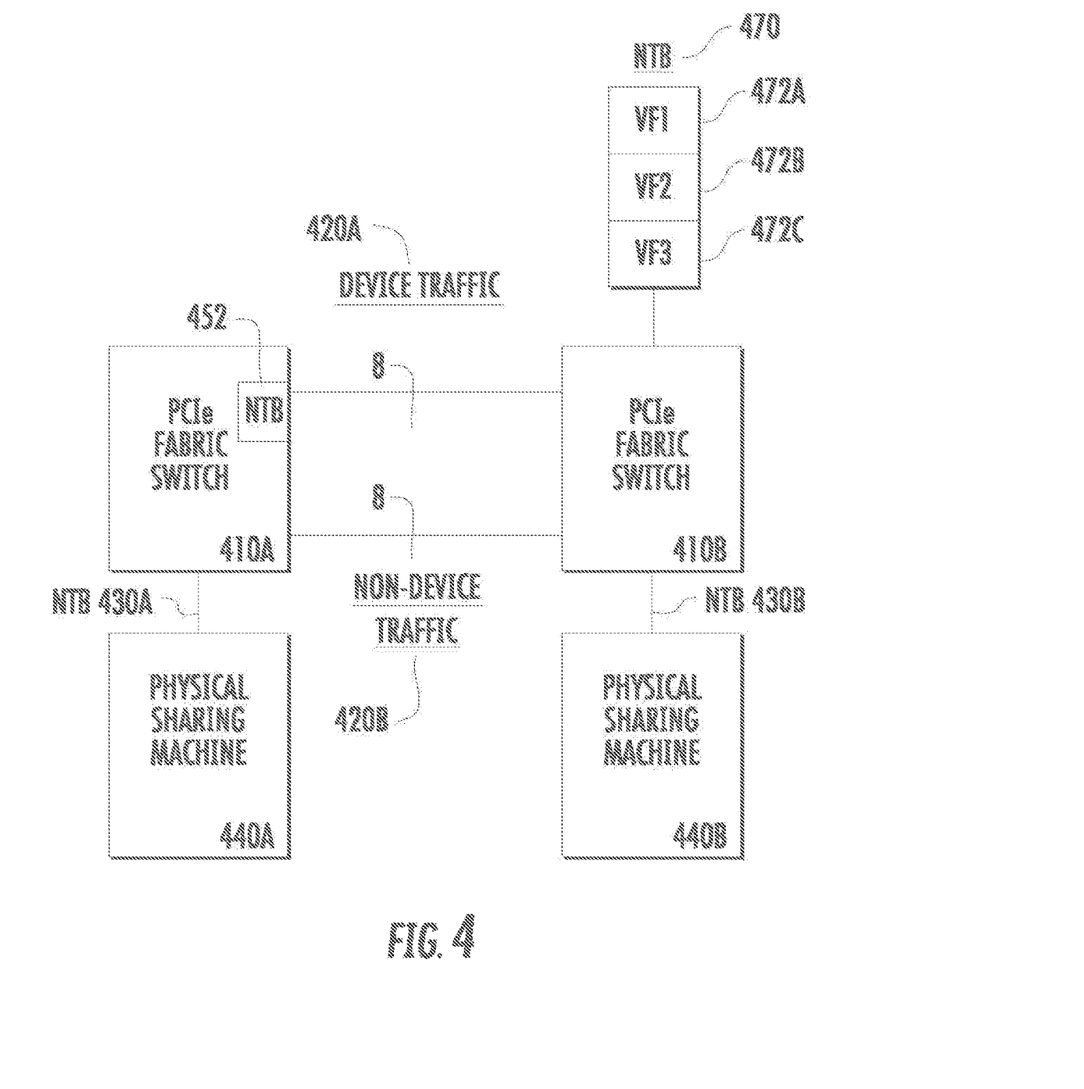
FIG. 4 is a block diagram of a fourth implementation using a switch that is cross-coupled to two sides of a network architecture to direct requests by a function from a device on an interconnect fabric in which an NTB is directly integrated into the main switches.

FIG. 4 is a block diagram of a fourth implementation using a switch that is cross-coupled to two sides of a network architecture to direct requests by a function from a device on an interconnect fabric in which an NTB is directly integrated into the main switches. In FIG. 4, PCIe fabric switch 410A has NTB 452 directly integrated into it, rather than having NTB 452 reside on a separate chip. When NIC 470 sends a request, such as from VF1 472A, VF2 472B, or VF3 472C, it is routed through port 464 into PCIe fabric switch 410B as discussed above with respect to other implementations. However, FIG. 4 manages the routing in a somewhat different way than other implementations. For example, PCIe fabric switch 410A and PCIe fabric switch 410B may communicate through 16 lanes. Such communication may be split between 8 device traffic lanes 420A and 8 non-device traffic lanes 420B. Device traffic, for which isolation is necessary, is forced through the device traffic lanes 420A, whereas other traffic may be sent through non-device traffic lanes 420B. Whether a request is intended for sharing machine 440A or 440B, it may be forced through device traffic lanes 420A so that it may be routed by the NTB integrated into PCIe switch 410A so as to maintain isolation. Such isolation is not as required for other kinds of traffic, so the NTB may be unnecessary for other traffic and it may simply be omitted from the transmission process. Thus, FIG. 4 provides an approach that isolates device traffic while minimizing the overhead for other types of traffic on the bus.

The implementation of FIG. 4 provides an alternative way to incorporate an NTB with A-LUTs into the switching fabric. This goal may be accomplished by using main switching chips with NTBs directly integrated into the main switch chips themselves. The goal may be accomplished by replacing the switch chips with slightly different switch chips with integrated NTBs to provide the implementation with NTBs. This implementation splits the 16-lane connection into two 8-lane connections and enables the integrated NTB on one of the large switch chips 410A. In a manner similar to the first implementation, it becomes possible to use A-LUTs on one of the 8-lane ports for isolation and protection for devices, while using the other 8-lane port for non-device traffic.

The approach presented by various implementations resolves isolation issues by adding routing hardware to the computer interconnect fabric rather than requiring modifying devices themselves.

Figure 5:
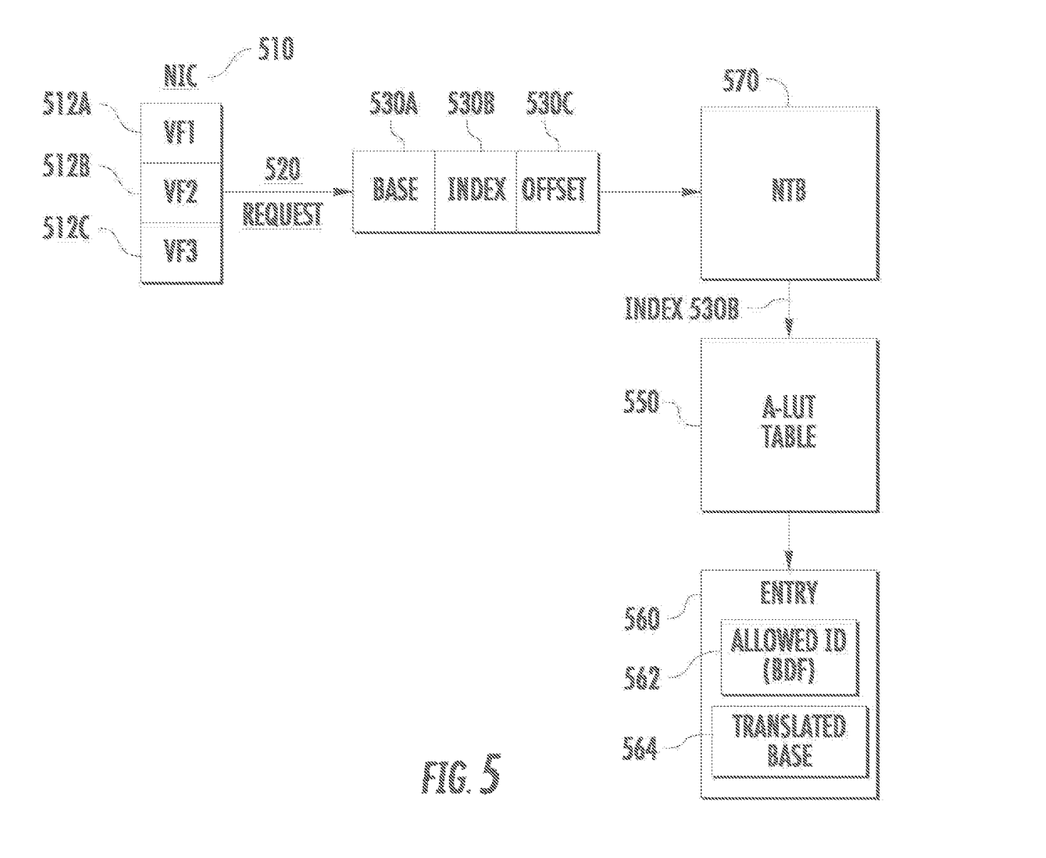
FIG. 5 is a diagram of an example dataflow that shows how address-lookup tables are used to route requests.

FIG. 5 is an example dataflow that shows how address-lookup tables are used to route requests. FIG. 5 shows NIC 510, which is an example device that may host virtual functions including VF1 512A, VF2 512B, and VF3 512C. The virtual functions may provide physical and/or virtual sharing machines with a managed interface to functionality provided by NIC 510. When a virtual function wants to communicate with the sharing machine, the virtual function issues request 520. Request 520 includes addressing information including base 530A, index 530B, and offset 530C information. Request 520 is provided to NTB 540 for forwarding through A-LUT table 550. Various implementations have been provided in FIGS. 1-4 that provide ways in which request 520 can be forced through NTB 540 and subsequently A-LUT table 550 to ensure that request 520 is properly routed. As discussed previously, A-LUT table 550 is a page table. This means that it includes a table of entries with addresses to pages. The pages provided by the A-LUTs used here are address spaces used by physical sharing machines on the PCIe fabric. As discussed above, entries may generally be sized as a power of 2 that is 4096 bytes or greater, though some implementations may use other sizes. By considering the base 530A which is part of request 520 and using index 530B to reference A-LUT table 550, index is used to find a specific entry 560 in A-LUT table that corresponds to request 520. Entry 560 includes at least two pieces of information. Entry 560 includes allowed ID information 562. This information may be in BDF form, and includes information about the bus/device/function for which entry 560 allows communication. Entry 560 also includes information about translated base address 564, which can be used in the routing process, as discussed above.

Figure 6:
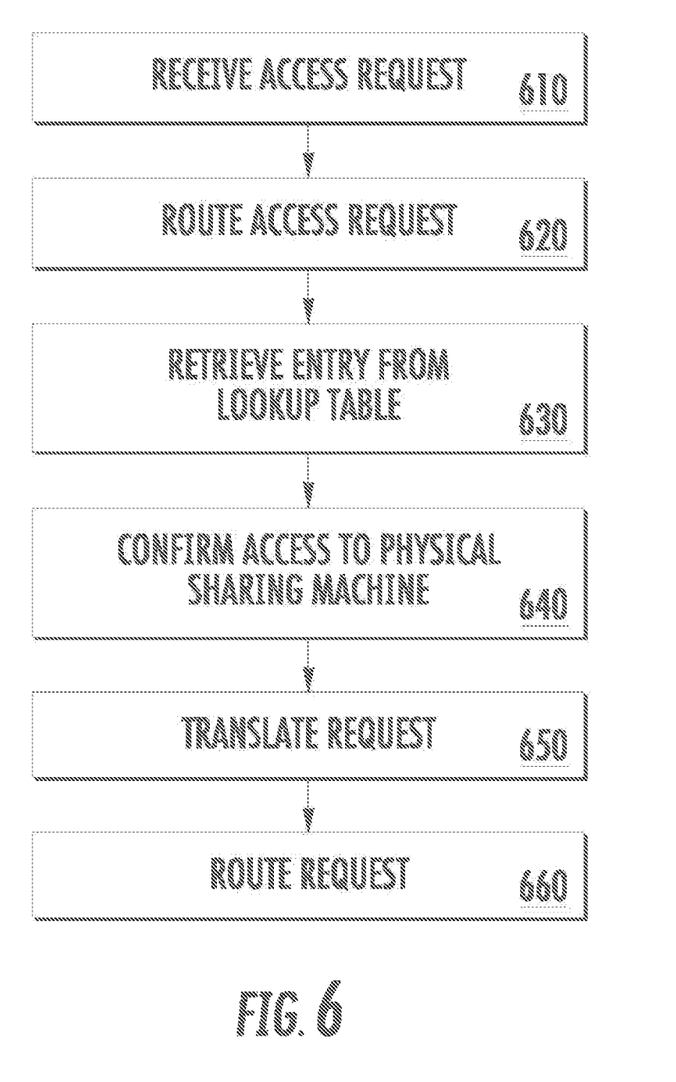
FIG. 6 is a flowchart of an example process for routing isolated requests.

FIG. 6 is a flowchart of an example process for routing isolated requests.

Block 610 includes receiving an access request. More specifically, block 610 includes receiving an access request at a computer interconnect fabric, caused by accessing a function provided by a device coupled to the computer interconnect fabric. The access request is directed to a physical sharing machine that is communicatively coupled to the computer interconnect fabric through a non-transparent bridge (NTB). The physical sharing machine is associated with a global address range and an ID. This part of the functionality of implementations may occur, for example, as in FIG. 1 when NIC 170 sends an access request to PCIe fabric switch 110B from a virtual function, such as VF2 172B.

Block 620 includes routing the access request. More specifically, block 620 includes routing the access request through the computer interconnect fabric from the device to a pre-defined port of a switch at which an NTB is enabled. This part of the functionality of implementations may occur, for example, as in FIG. 1 where PCIe fabric switch 110B forces the request through port 162 into switch 150 where NTB 152 resides.

Block 630 includes retrieving an entry from a lookup table. More specifically, block 630 includes using address and source identity information related to the access request received at the switch to retrieve a corresponding entry in an address-translation lookup table at the switch. The entry includes the identity of the function, and the global address range and the ID of the physical sharing machine. This part of the functionality of implementations may occur, for example, as in FIG. 1 where NTB 152 does a lookup through an A-LUT as portrayed in FIG. 5.

Block 640 includes confirming access to a physical sharing machine. More specifically, block 640 includes confirming, based on the entry that the function is allowed to access the physical sharing machine. This is a check that may be performed by the NTB 152, such that when entry 560 is retrieved by A-LUT table 550, because there will be no entry if the request is invalid and the routing will not be performed.

Blocks 650 and 660 occur once access has been confirmed in block 640. Block 650 includes translating the request. More specifically, block 650 includes translating the access request based on the entry. The translation corresponds to an offset within the global address range of the physical sharing machine with which the request is associated. This part of the functionality of implementations may occur, for example, as in FIG. 5 by integrating translated base 562 into the request for routing purposes.

Block 660 includes routing the request. More specifically, block 660 includes routing the access request to the physical sharing machine based on the global address range, the offset, and the ID. This part of the functionality of implementations may occur for example, as in FIG. 1 where the request is sent into a loopback cable 156, then transmitted through port 162 to a physical sharing machine such as physical sharing machine 140B. In other implementations and in general, routing may occur in a variety of similar ways appropriate to a given implementation. The addressing information from block 650 governs how the routing occurs, which targets a memory location based on the global address range and offset. Additionally, the ID information helps direct the request to the appropriate physical sharing machine.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for routing access requests produced by a function to a physical sharing machine, the method comprising:
   receiving, at a computer interconnect fabric, a plurality of access requests, each access request received by accessing a function provided by a device coupled to a network that includes the computer interconnect fabric, the access request being directed to a physical sharing machine that is communicatively coupled to the network, wherein the physical sharing machine is a host and the physical sharing machine is associated with a global address range and an ID, and the access requests are for a plurality of different devices;
   for each access request:
      routing the access request through the computer interconnect fabric from the device to a single pre-defined external port of a first switch to a second switch that is distinct from the computer interconnect fabric, wherein the pre-defined port is pre-defined as a port that contains an address-translation lookup table for bus-device-function information for which the entry allows communication and the global address range and the ID of the physical sharing machine;
      using, at the second switch, address and source identity information related to the access request to retrieve a corresponding entry in the address-translation lookup table, wherein the entry in the address-translation lookup table includes bus-device-function information for which the entry allows communication and the global address range and the ID of the physical sharing machine;
      confirming, at the second switch, based on the information in the address-translation lookup table associated with the entry, that the function is allowed to access the physical sharing machine, and in response to the confirming:
      translating, at the second switch, the access request based on the entry, to be routed using the second switch, to an offset within the global address range of the physical sharing machine with which the request is associated; and
      routing the access request to the physical sharing machine based on the global address range, the offset, and the ID.

2. The method of claim 1, wherein the access request is directed to a physical sharing machine that is communicatively coupled to a computer interconnect fabric through a non-transparent bridge (NTB), wherein the physical sharing machine is a host and the physical sharing machine is associated with the global address range and the ID.

3. The method of claim 2, wherein the computer interconnect fabric is a PCIe fabric and wherein the ID is a PCIe source ID.

4. The method of claim 1, wherein the device is a self-virtualizing device under the SR-IOV specification.

5. The method of claim 1, wherein the function is a virtual function.

6. The method of claim 1, wherein the translating the access request comprises:
   translating the access request into the global address range, by the second switch, prior to routing the access request to the physical sharing machine.

7. A system for routing access requests produced by a function to a physical sharing machine on a computer interconnect fabric, the system comprising:
   a computer interconnect fabric and a second switch coupled to the computer interconnect fabric, wherein:
   the computer interconnect fabric is configured to perform operations comprising:
      receiving, at the computer interconnect fabric, a plurality of access requests, each access request received by accessing a function provided by a device coupled to a network that includes the computer interconnect fabric, the access request being directed to a physical sharing machine that is communicatively coupled to the network, wherein the physical sharing machine is a host and the physical sharing machine is associated with a global address range and an ID, and the access requests are for a plurality of different devices;
   for each access request:
      routing the access request through the computer interconnect fabric from the device to a single pre-defined external port of a first switch to a second switch that is distinct from the computer interconnect fabric, wherein the pre-defined port is pre-defined as a port that contains an address-translation lookup table for bus-device-function information for which the entry allows communication and the global address range and the ID of the physical sharing machine; and
   the second switch is configured to perform operations comprising:
      using address and source identity information related to the access request to retrieve a corresponding entry in an address-translation lookup table, wherein the entry in the address-translation lookup table includes bus-device-function information for which the entry allows communication and the global address range and the ID of the physical sharing machine;
      confirming, based on the information in the address-translation lookup table associated with the entry, that the function is allowed to access the physical sharing machine, and in response to the confirming:
      translating the access request based on the entry, to be routed using the second switch to an offset within the global address range of the physical sharing machine with which the request is associated; and
      routing the access request to the physical sharing machine based on the global address range, the offset, and the ID.

8. The system of claim 7, wherein the access request is directed to a physical sharing machine that is communicatively coupled to the computer interconnect fabric through a non-transparent bridge (NTB), wherein the physical sharing machine is a host and the physical sharing machine is associated with the global address range and the ID.

9. The system of claim 8, wherein the computer interconnect fabric is a PCIe fabric and wherein the ID is a PCIe source ID.

10. The system of claim 7, wherein the device is a self-virtualizing device under the SR-IOV specification.

11. The system of claim 7, wherein the function is a virtual function.

12. The system of claim 7, wherein the translating the access request comprises:

translating the access request into the global address range, by the second switch, prior to routing the access request to the physical sharing machine.

* * * * *